(12) United States Patent
Takashima et al.

(10) Patent No.: US 9,164,763 B2
(45) Date of Patent: Oct. 20, 2015

(54) SINGLE INSTRUCTION GROUP INFORMATION PROCESSING APPARATUS FOR DYNAMICALLY PERFORMING TRANSIENT PROCESSING ASSOCIATED WITH A REPEAT INSTRUCTION

(75) Inventors: Satoshi Takashima, Tokyo (JP); Hirokazu Hanaki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 896 days.

(21) Appl. No.: 12/805,907

(22) Filed: Aug. 24, 2010

(65) Prior Publication Data

US 2011/0099354 A1 Apr. 28, 2011

(30) Foreign Application Priority Data

Oct. 26, 2009 (JP) ................................ 2009-245013

(51) Int. Cl.
*G06F 15/00* (2006.01)
*G06F 9/30* (2006.01)
*G06F 9/40* (2006.01)
*G06F 9/38* (2006.01)
*G06F 9/345* (2006.01)
*G06F 9/355* (2006.01)

(52) U.S. Cl.
CPC ........ *G06F 9/30036* (2013.01); *G06F 9/30065* (2013.01); *G06F 9/3455* (2013.01); *G06F 9/3552* (2013.01); *G06F 9/3836* (2013.01); *G06F 9/3853* (2013.01); *G06F 9/3893* (2013.01)

(58) Field of Classification Search
None
See application file for complete search history.

(56) References Cited

U.S. PATENT DOCUMENTS

2001/0021972 A1* 9/2001 Topham ................. 712/217
2009/0213128 A1* 8/2009 Chen ..................... 345/503

FOREIGN PATENT DOCUMENTS

JP 2002-229779 8/2002

* cited by examiner

*Primary Examiner* — George Giroux
(74) *Attorney, Agent, or Firm* — Hazuki International, LLC

(57) ABSTRACT

An information processing apparatus includes an instruction supplying section that supplies a plurality of instructions as a single instruction group, an executing section that repetitively executes a plurality of execution processes corresponding to the plurality of instructions in parallel, an issue timing control section that controls an issue timing of each of the instructions to the executing section so that the plurality of execution processes are executed with a timing delayed in accordance with a predetermined latency, and an operand transforming section that transforms an operand register address of each of the instructions in accordance with a predetermined increment value upon every repetition of execution in the executing section.

11 Claims, 18 Drawing Sheets

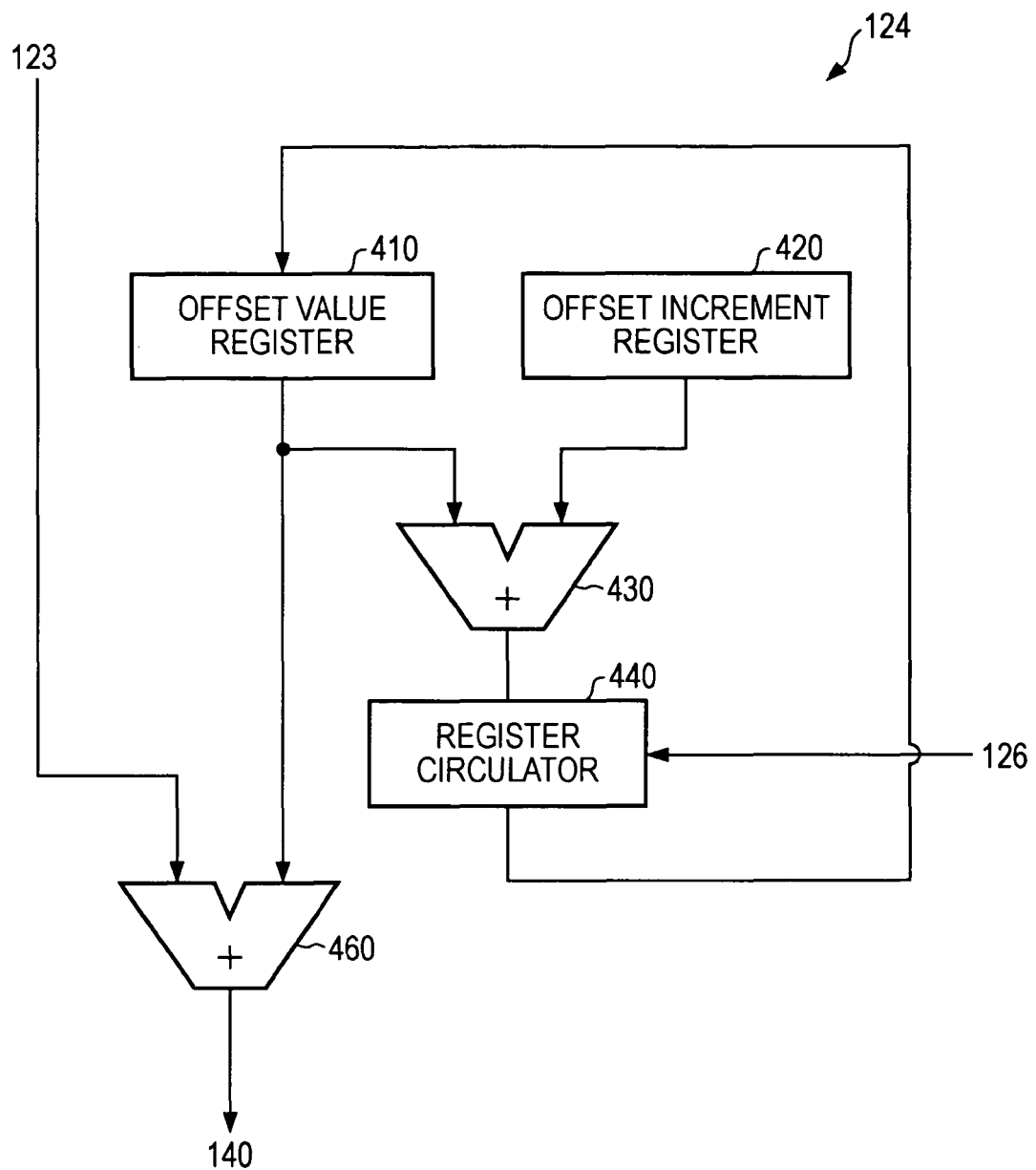

FIG. 5

| | | | | |
|---|---|---|---|---|
| 1ST CYCLE | ISSUE INSTRUCTION A | NOP | NOP | NOP |
| 2ND CYCLE | ISSUE INSTRUCTION A | NOP | NOP | NOP |
| 3RD CYCLE | ISSUE INSTRUCTION A | ISSUE INSTRUCTION B | NOP | NOP |
| 4TH CYCLE | ISSUE INSTRUCTION A | ISSUE INSTRUCTION B | NOP | NOP |
| 5TH CYCLE | ISSUE INSTRUCTION A | ISSUE INSTRUCTION B | ISSUE INSTRUCTION C | NOP |
| 6TH CYCLE | ISSUE INSTRUCTION A | ISSUE INSTRUCTION B | ISSUE INSTRUCTION C | NOP |
| 7TH CYCLE | ISSUE INSTRUCTION A | ISSUE INSTRUCTION B | ISSUE INSTRUCTION C | ISSUE INSTRUCTION D |
| 8TH CYCLE | ISSUE INSTRUCTION A | ISSUE INSTRUCTION B | ISSUE INSTRUCTION C | ISSUE INSTRUCTION D |
| ⋮ | ⋮ | ⋮ | ⋮ | ⋮ |
| 255TH CYCLE | ISSUE INSTRUCTION A | ISSUE INSTRUCTION B | ISSUE INSTRUCTION C | ISSUE INSTRUCTION D |
| 256TH CYCLE | ISSUE INSTRUCTION A | ISSUE INSTRUCTION B | ISSUE INSTRUCTION C | ISSUE INSTRUCTION D |
| 257TH CYCLE | NOP | ISSUE INSTRUCTION B | ISSUE INSTRUCTION C | ISSUE INSTRUCTION D |
| 258TH CYCLE | NOP | ISSUE INSTRUCTION B | ISSUE INSTRUCTION C | ISSUE INSTRUCTION D |
| 259TH CYCLE | NOP | NOP | ISSUE INSTRUCTION C | ISSUE INSTRUCTION D |
| 260TH CYCLE | NOP | NOP | ISSUE INSTRUCTION C | ISSUE INSTRUCTION D |
| 261ST CYCLE | NOP | NOP | NOP | ISSUE INSTRUCTION D |
| 262ND CYCLE | NOP | NOP | NOP | ISSUE INSTRUCTION D |

FIG. 6A

```
for (int i=0; i<256; i++) {
    m[i] = (a[i] * b[i]);
    n[i] = m[i] >> c;
}
```

FIG. 6B

```
1          ld r0:r1,$mem() | nop            | nop              | nop;
2          ld r2:r3,$mem() | nop            | nop              | nop;
3          ld r0:r1,$mem() | mul m0,r0,r1   | nop              | nop;
4          ld r2:r3,$mem() | mul m1,r2,r3   | nop              | nop;
5          ld r0:r1,$mem() | mul m0,r0,r1   | sra r16,m0,r23   | nop:
6          ld r2:r3,$mem() | mul m1,r2,r3   | sra r17,m1,r23   | nop;

7  LABEL:  ld r0:r1,$mem() | mul m0,r0,r1   | sra r16,m0,r23   | sw r16,$mem();
8          ld r2:r3,$mem() | mul m1,r2,r3   | sra r17,m1,r23   | sw r17,$mem();
9          loop LABEL      | nop            | nop              | nop 10         nop             | mul m0,r0,r1   | sra r16,m0,r23   | sw r16,$mem();
11         nop             | mul m1,r2,r3   | sra r17,m1,r23   | sw r17,$mem();
12         nop             | nop            | sra r16,m0,r23   | sw r16,$mem();
13         nop             | nop            | sra r17,m1,r23   | sw r17,$mem();
14         nop             | nop            | nop              | sw r16,$mem();
15         nop             | nop            | nop              | sw r17,$mem();
```

FIG. 7A
| REPEAT INSTRUCTION | nop | nop | nop |
|---|---|---|---|
| INSTRUCTION A | INSTRUCTION B | INSTRUCTION C | INSTRUCTION D |
FIG. 7B
rpt rptr | nop | nop | nop;
ld r0:r1,$mem | mul m0,r0,r1 | sra r16,m0,r23 | sw r16,$mem;
FIG. 7C
| REPEAT FLAG | INSTRUCTION A | INSTRUCTION B | INSTRUCTION C | INSTRUCTION D |
|---|---|---|---|---|
FIG. 7D
[rpt] ld r0:r1,$mem() | mul m0,r0,r1 | sra r16,m0,r23 | sw r16,$mem();

FIG. 8A

| LATENCY | REGISTER OFFSET VALUE | REGISTER ADDRESS |
|---|---|---|
| 1 | 0 | R0 |
| 2 | 0 → 1 | R0 → R1 |
| 3 | 0 → 1 → 2 | R0 → R1 → R2 |

FIG. 8B

| LATENCY | REGISTER OFFSET VALUE | REGISTER ADDRESS |
|---|---|---|
| 1 | 0 | M0 |
| 2 | 0 → 1 | M0 → M1 |

| HALFWORD DESIGNATION SIGNAL | SOURCE DATA SELECTION |
|---|---|
| 0 | 16 BITS ON LSB SIDE |
| 1 | 16 BITS ON MSB SIDE |

| HALFWORD DESIGNATION SIGNAL | EXECUTION-RESULT-DATA SELECTION |
|---|---|
| 0 | 16 BITS ON LSB SIDE |
| 1 | 16 BITS ON MSB SIDE |

FIG. 17A $$\text{Result} = \left( \sum_{n=0}^{8} (L[8+n]+L[8-n]) \times \text{Coef}[n] \right) \gg \text{NORM}$$

| | 31    16 | 15    0 |
|---|---|---|
| R8 |  | L[16] |
| R7 | L[15] | L[14] |
| R6 | L[13] | L[12] |
| R5 | L[11] | L[10] |
| R4 | L[9] | L[8] |
| R3 | L[7] | L[6] |
| R2 | L[5] | L[4] |
| R1 | L[3] | L[2] |
| R0 | L[1] | L[0] |

| | 31    16 | 15    0 |
|---|---|---|
| KR4 |  | Coef[8] |
| KR3 | Coef[7] | Coef[6] |
| KR2 | Coef[5] | Coef[4] |
| KR1 | Coef[3] | Coef[2] |
| KR0 | Coef[1] | Coef[0] |

FIG. 18A

```
1   rpt 9              | nop;
2   addh a0,r0,r0      | madd m0,a0,k0;
3   sra r9,m0,NORM     | nop;
```

FIG. 18B

```
1    addh a0,r4(LSB),r4(LSB)   | nop;
2    addh a0,r4(MSB),r3(MSB)   | madd m0,a0,k0(LSB);
3    addh a0,r5(LSB),r3(LSB)   | madd m0,a0,k0(MSB);
4    addh a0,r5(MSB),r2(MSB)   | madd m0,a0,k1(LSB);
5    addh a0,r6(LSB),r2(LSB)   | madd m0,a0,k1(MSB);
6    addh a0,r6(MSB),r1(MSB)   | madd m0,a0,k2(LSB);
7    addh a0,r7(LSB),r1(LSB)   | madd m0,a0,k2(MSB);
8    addh a0,r7(MSB),r0(MSB)   | madd m0,a0,k3(LSB);
9    addh a0,r8(LSB),r0(LSB)   | madd m0,a0,k3(MSB);
10   nop                       | madd m0,a0,k4(LSB);
11   sra r9,m0,NORM            | nop;
```

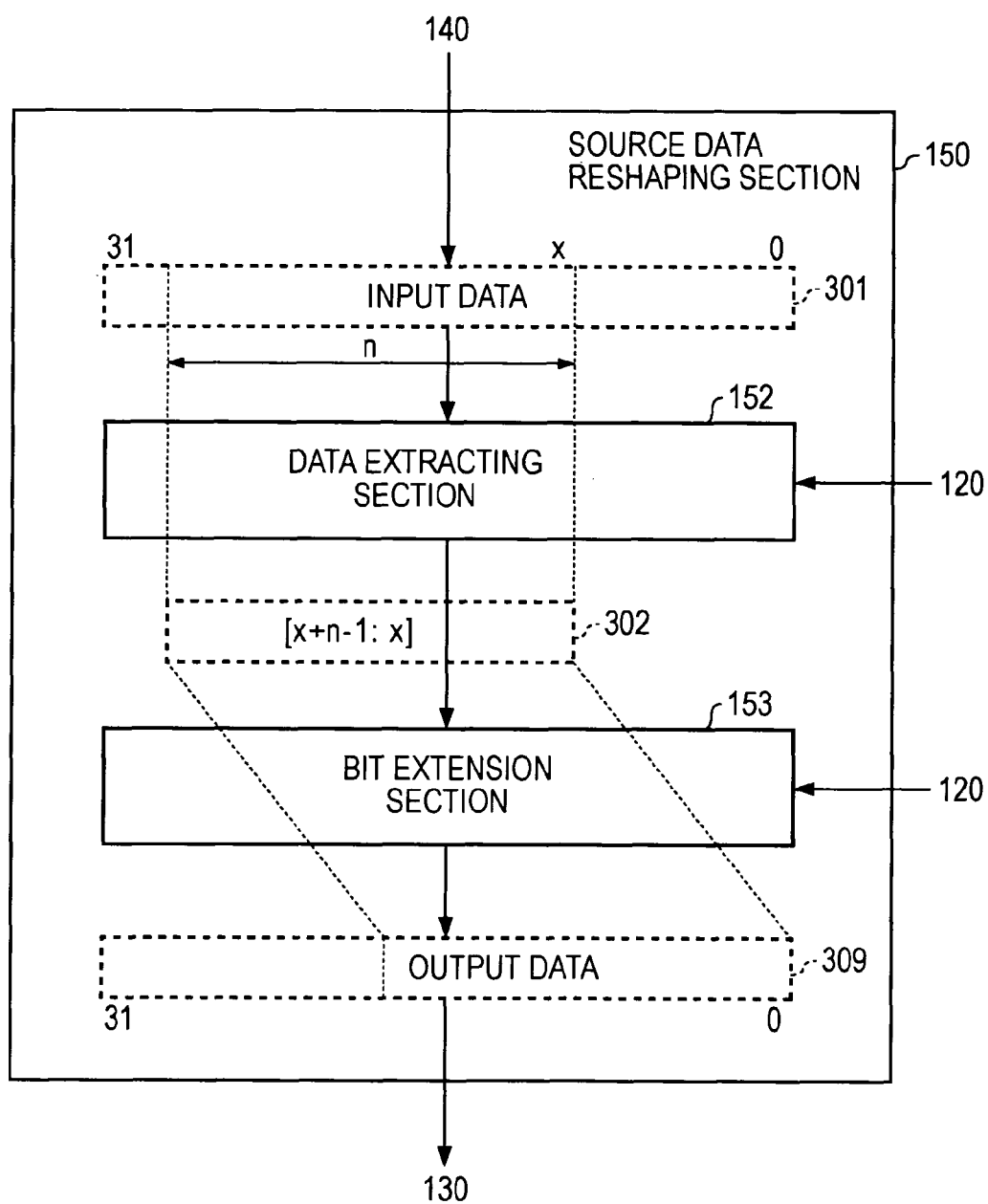

SINGLE INSTRUCTION GROUP INFORMATION PROCESSING APPARATUS FOR DYNAMICALLY PERFORMING TRANSIENT PROCESSING ASSOCIATED WITH A REPEAT INSTRUCTION

BACKGROUND OF THE INVENTION

1. Field of the Invention

The present invention relates to an information processing apparatus, in particular, an information processing apparatus that supplies and executes a plurality of instructions as a single instruction group.

2. Description of the Related Art

With the proliferation of multimedia in ordinary households in recent years, there has been an increasing demand for improved performance of processors that perform image processing and sound processing. Accordingly, parallel processing techniques have been employed in an attempt to speed up processors. For instance, processors that execute SIMD (Single Instruction stream Multiple Data stream) instructions exist as an example of data-level parallel processing technique. Also, VLIW processors (Very Long Instruction Word Processors) exist as an example of instruction-level parallel processing technique. Further, in order to perform parallel processing in the temporal direction, a technique has been employed in which the number of pipeline stages is increased to improve the processor's operating clock frequency.

Of these techniques, a VLIW processor achieves enhanced parallelism by simultaneously executing a plurality of instructions contained in a single instruction group (VLIW instruction), thereby improving processor performance. For example, four processes are specified in a single instruction group and executed in parallel, thereby enabling high speed computation processing. Also, this VLIW processor uses an instruction that designates repetition of a process when the same process is to be performed on a plurality of pieces of data, thereby removing instruction code repetitions for improved code efficiency. For example, in the related art, there is a repeat instruction that repetitively executes a process within a repeat block (see, for example, Japanese Unexamined Patent Application Publication No. 2002-229779 (FIG. 15)).

SUMMARY OF THE INVENTION

When the repeat instruction according to the related art described above is used, it is unnecessary to write down processes with respect to a plurality of pieces of data in the VLIW processor, thus enabling an improvement in code efficiency. However, if there are dependencies between a plurality of instructions, it is necessary to shift the execution timing of each instruction, and thus transient processing becomes necessary before and after steady-state repetitive processing due to the repeat instruction. If it is attempted to statically perform this transient processing at the time of compiling, a no-operation (NOP) instruction is repetitively inserted many times, which adversely affects the code efficiency that has been improved by use of the repeat instruction.

It is desirable to dynamically perform transient processing associated with a repeat instruction in a VLIW processor.

According to an embodiment of the present invention, there is provided an information processing apparatus including an instruction supplying section that supplies a plurality of instructions as a single instruction group, an executing section that repetitively executes a plurality of execution processes corresponding to the plurality of instructions in parallel, an issue timing control section that controls an issue timing of each of the instructions to the executing section so that the plurality of execution processes are executed with a timing delayed in accordance with a predetermined latency, and an operand transforming section that transforms an operand register address of each of the instructions in accordance with a predetermined increment value upon every repetition of execution in the executing section. As a result, the instructions are repetitively executed with a timing delayed in accordance with the latency, while transforming the operand register address of each of the plurality of instructions.

In an embodiment of the present invention, when transforming the operand register address, the operand transforming section may cause the operand register address to circulate in accordance with the latency. As a result, when the plurality of instructions are repetitively executed, each of operand register addresses is caused to circulate in accordance with the latency. In this case, when transforming the operand register address, the operand transforming section may perform the circulation by performing an addition or subtraction on the operand register address in accordance with the increment and then calculating a remainder due to the latency.

In an embodiment of the present invention, the operand transforming section may attach information identifying a halfword to the operand register address assigned in word units to transform the operand register address in halfword units. As a result, when the plurality of instructions are repetitively executed, each of operand register addresses is transformed in halfword units.

In an embodiment of the present invention, the instruction group may include repeat information designating whether or not repetitive execution is necessary, and the executing section may repetitively execute the plurality of execution processes corresponding to the plurality of instructions included in the instruction group if the repeat information designates repetitive execution. As a result, the plurality of execution processes are repetitively executed in accordance with the repeat information such as a repeat instruction or a repeat flag.

In an embodiment of the present invention, the information processing apparatus may further include registers each accessed by the operand register address transformed by the operand transforming section, a source data reshaping section that reshapes source data read from each of the registers, and supplies the reshaped source data to the executing section, and an execution-result-data reshaping section that reshapes execution result data of the executing section, and supplies the reshaped execution result data to each of the registers as write data. As a result, the necessity of separately executing an instruction for performing data reshaping is obviated, thereby enabling a reduction in program code size. In this case, the source data reshaping section may supply one of upper 16 bits and lower 16 bits of 32-bit data to the executing section, the executing section may perform each of the execution processes after applying bit extension to tha one of upper 16 bits and lower 16 bits, and outputs the execution result data of 32 bits, and the execution-result-data reshaping section may supply lower 16 bits of the execution result data of the executing section, as one of upper 16 bits and lower 16 bits of the write data.

According to an embodiment of the present invention, there is provided an instruction decoder including an issue timing control section that controls an issue timing of each of a plurality of instructions supplied as a single instruction group so that a plurality of execution processes corresponding to the plurality of instructions are executed with a timing delayed in accordance with a predetermined latency, and an operand transforming section that transforms an operand register address of each of the instructions upon every repetition of each of the plurality of execution processes. As a result, the instructions are repetitively executed with a timing delayed in accordance with the latency, while transforming the operand register address of each of the plurality of instructions.

BRIEF DESCRIPTION OF THE DRAWINGS

FIG. 3 is a diagram showing an example of the configuration of an operand transforming section according to the first embodiment of the present invention;

FIG. 5 is a diagram showing an example of image of how a VLIW instruction is executed according to an embodiment of the present invention;

FIGS. 6A and 6B are diagrams showing an example of coding by a VLIW instruction according to the related art;

FIGS. 7A to 7D are diagrams each showing an example of coding by a VLIW instruction according to an embodiment, of the present invention;

FIGS. 8A and 8B are diagrams showing an example of circulation of a register offset value by a register circulator according to an embodiment of the present invention;

FIGS. 17A to 17C are diagrams showing an example of the relationship between registers and arrays in a symmetric filtering operation as an example of application of the second embodiment of the present invention;

FIGS. 18A and 18B are diagrams each showing an example of program code of a filtering operation as an example of application of the second embodiment of the present invention;

FIG. 19 is a diagram showing a first modification of a source data reshaping section according to an embodiment of the present invention.

DESCRIPTION OF THE PREFERRED EMBODIMENTS

Hereinbelow, modes for carrying out the present invention (hereinafter, referred to as embodiments) will be described. The description will be given in the following order.
1. First Embodiment (example of transforming operand register addresses in word units)
2. Second Embodiment (example of transforming operand register addresses in halfword units)
3. Modifications (example of performing reshaping of source data at an arbitrary bit position)

<1. First Embodiment>
[Example of Configuration of Information Processing Apparatus]

Figure 1:
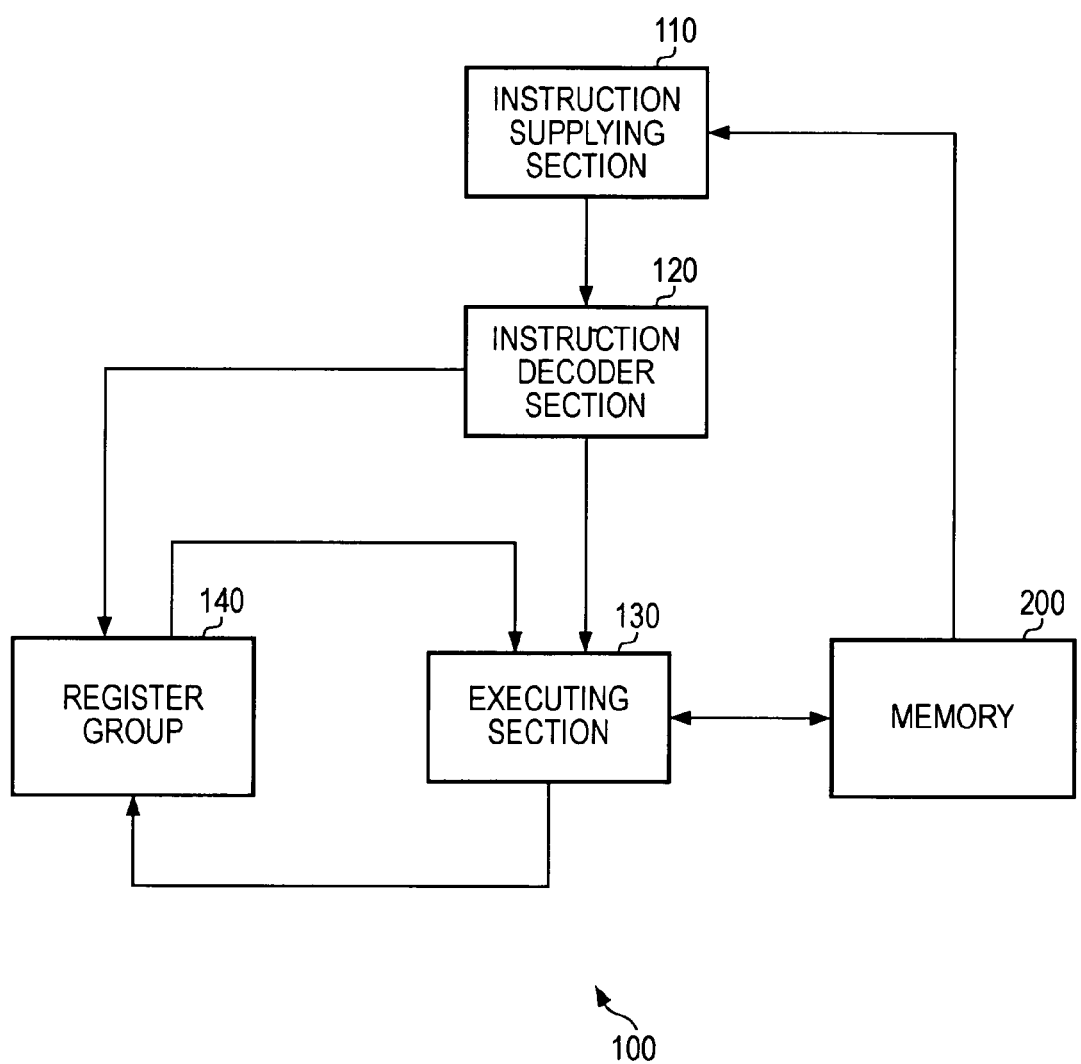
FIG. 1 is a diagram showing an example of the configuration of an information processing apparatus according to a first embodiment of the present invention.

FIG. 1 is a diagram showing an example of the configuration of an information processing apparatus 100 according to a first embodiment of the present invention. The information processing apparatus 100 is a VLIW processor that simultaneously fetches a plurality of instructions as a single instruction group and simultaneously executes the fetched instructions. In this embodiment, it is assumed that the information processing apparatus 100 is capable of executing four instructions simultaneously. The information processing apparatus 100 connects to a memory 200, and includes an instruction supplying section 110, an instruction decoder section 120, an executing section 130, and a register group 140.

The instruction supplying section 110 simultaneously fetches a plurality of instructions stored in the memory 200 as a single instruction group, and supplies the fetched instructions to the instruction decoder section 120. Since the information processing apparatus 100 is a VLIW processor that executes four instructions simultaneously, the instruction supplying section 110 also fetches four instructions simultaneously.

The instruction decoder section 120 decodes the instructions supplied from the instruction supplying section 110, and causes the processing of individual instructions to be executed by the executing section 130 in accordance with the decode result. Since the information processing apparatus 100 is a VLIW processor that executes four instructions simultaneously, the instruction decoder section 120 also decodes four instructions simultaneously. The internal configuration of the instruction decoder section 120 will be described later.

The executing section 130 executes processing of individual instructions in parallel in accordance with the result of decoding by the instruction decoder section 120. This embodiment assumes the presence of first to fourth units that operate simultaneously, of which the first and fourth units, and the second and third units are capable of simultaneously executing load/store instructions and arithmetic operation instructions, respectively.

The register group 140 is a group of registers necessary when executing instructions by the executing section 130. A target register is specified by the instruction decoder section 120, data read from the register is supplied to the executing section 130, and also data is written into the register from the executing section 130. The register group 140 is defined by the instruction set of the information processing apparatus 100. The breakdown of the register group 140 will be described later. It should be noted that the register group 140 represents an example of registers described in the claims.

[Example of Configuration of Instruction Decoder Section]

Figure 2:
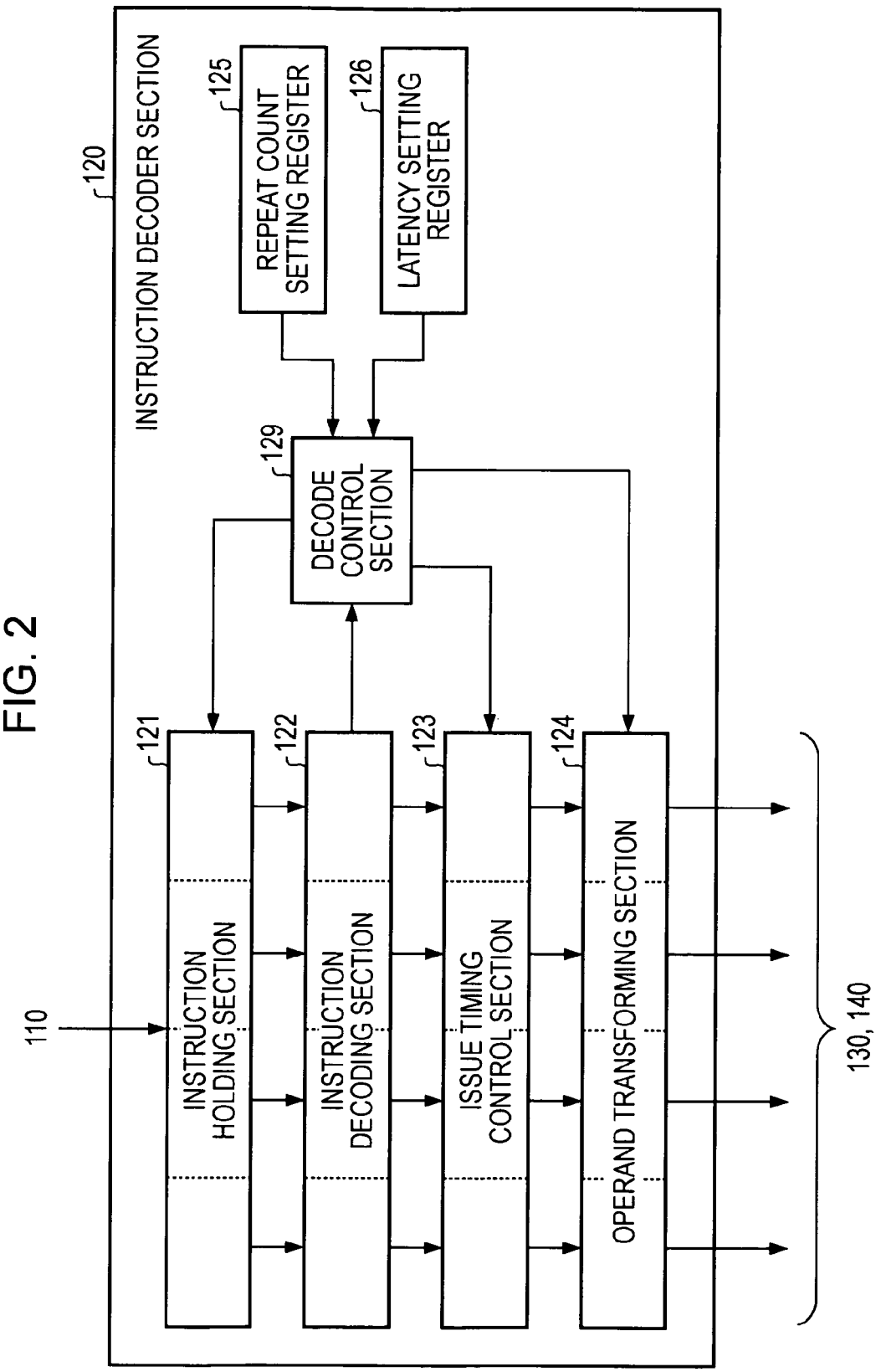
FIG. 2 is a diagram showing an example of the configuration of an instruction decoder section according to an embodiment of the present invention.

FIG. 2 is a diagram showing an example of the configuration of the instruction decoder section 120 according to an embodiment of the present invention. The instruction decoder section 120 includes an instruction holding section 121, an instruction decoding section 122, an issue timing control section 123, an operand transforming section 124, a repeat count setting register 125, a latency setting register 126, and a decode control section 129.

The instruction holding section 121 temporarily holds a VLIW instruction supplied from the instruction supplying section 110. In this embodiment, a single VLIW instruction contains four instructions respectively corresponding to the first to fourth units described above.

The instruction decoding section 122 decodes the four instructions held in the instruction holding section 121. As a result, control signals necessary for internal control of the information processing apparatus 100 are generated. That is, the addresses of registers to be accessed, the kinds of computations performed, and the like are obtained as control signals.

The issue timing control section 123 controls the timing with which the decoded instructions are issued to the executing section 130. Although, as a rule, the four decoded instructions are issued simultaneously, if a latency described later is set in the latency setting register 126, each of the instructions is issued with its timing shifted by an amount corresponding to the latency.

The operand transforming section 124 transforms operand addresses included in the individual instructions in accordance with predetermined rules. The internal configuration of the operand transforming section 124 will be described later.

The repeat count setting register 125 is a register for setting the number of times to repeat the VLIW instruction. A repeat count is set in the repeat count setting register 125 in advance by a software instruction or the like.

The latency setting register 126 is a register for setting a latency for shifting the issue timing of individual instructions contained in the VLIW instruction. A latency is set in the latency setting register 126 in advance by a software instruction or the like. It should be noted that the latency setting register 126 may be set to a different value on a per-target instruction basis.

The decode control section 129 controls the instruction decoder section 120 as a whole. For example, the decode control section 129 holds instructions in the instruction holding section 121 in accordance with the repeat count set in the repeat count setting register 125, and determines the issue timing of each individual instruction in accordance with the latency set in the latency setting register 126.

[Example of Configuration of Operand Transforming Section]

FIG. 3 is a diagram showing an example of the configuration of the operand transforming section 124 according to the first embodiment of the present invention. The operand transforming section 124 transforms operand register addresses in word units, and includes an offset value register 410, an offset increment register 420, adders 430 and 460, and a register circulator 440.

The offset value register 410 is a register that holds an offset value with respect to the operand register of each instruction issued from the issue timing control section 123. The value of the offset value register 410 is updated by the register circulator 440, and referenced by the adders 430 and 460.

The offset increment register 420 is a register that holds an increment value added to the offset value register 410 upon repetition of the VLIW instruction. The increment value held in the offset increment register 420 can take a negative value. The value of the offset increment register 420 is set in advance by a software instruction or the like, and referenced by the adder 430.

The adder 430 performs an addition of the value of the offset value register 410 and the value of the offset increment register 420. Since the offset increment register 420 can take a negative value, a subtraction is performed in that case. The addition result of the adder 430 is used for updating of the offset value register 410 by the register circulator 440.

The register circulator 440 updates the offset value of the operand register held in the offset value register 410, on the basis of the addition result of the adder 430. At the time of updating, the register circulator 440 performs control so that the value of the offset value register 410 circulates at each timing corresponding to the latency set in the latency setting register 126. Specifically, the register. circulator 440 can be implemented by a modulo operator. It should be noted that whether the circulation by the register circulator 440 is necessary or not can be set by the instruction decoder section 120.

The adder 460 adds the offset value held in the offset value register 410 to the operand register address of each instruction issued from the issue timing control section 123. The output of the adder 460 is supplied to the register group 140 as an operand register address. Therefore, in the register group 140, access is made to the operand register address with the offset value added. It should be noted that updating of the offset value register is performed as post processing after each VLIW instruction is issued.

In the operand transforming section 124, the offset value register 410 and the offset increment register 420 are provided to each operand of each instruction. This allows updates to be made to each operand with high degree of freedom. For example, in the case of an instruction set that can specify two source registers and one destination register, three sets of the offset value register 410 and offset increment register 420 are provided.

[Register Configuration of Register Group]

Figure 4A:
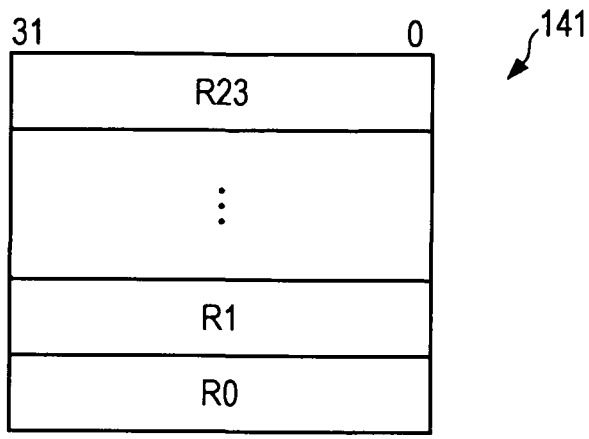
FIGS. 4A to 4C are diagrams each showing an example of the register configuration of a register group according to an embodiment of the present invention.
Figure 4B:
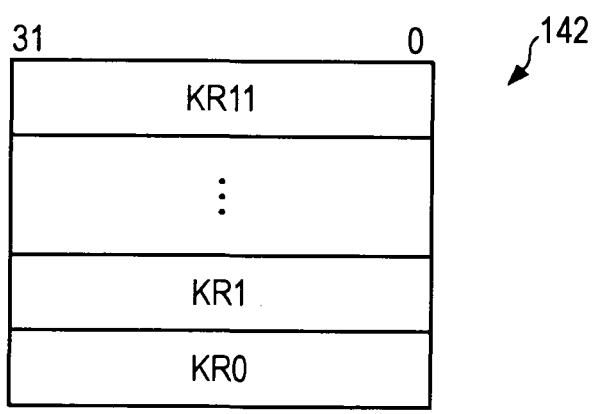
Figure 4C:
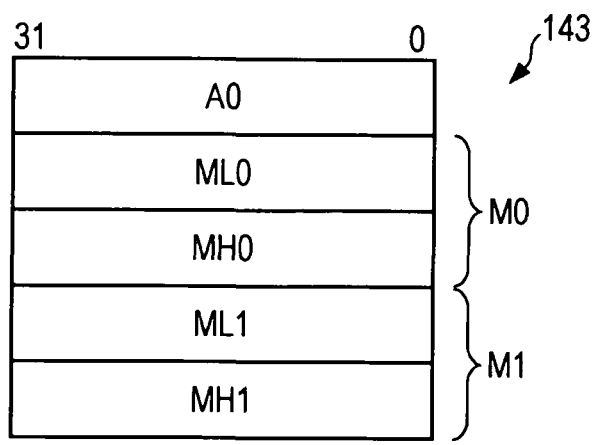

FIGS. 4A to 4C are diagrams each showing an example of the register configuration of the register group 140 according to an embodiment of the present invention. It is assumed that the register group 140 includes general purpose registers, coefficient registers, and accumulators.

FIG. 4A shows an example of the register configuration of general purpose registers 141. The general purpose registers 141 are registers used for general purposes at the time of processing by the executing section 130, and are used to hold source data for the executing section 130 or addresses for memory access and store data. In this example, 24 general purpose registers 141 (R0 to R23) with a 32-bit width are provided.

FIG. 4B shows an example of the register configuration of coefficient registers 142. The coefficient registers 142 are special registers provided for holding coefficients used in filtering operations or the like. In this example, 12 coefficient registers 142 (KR0 to KR11) with a 32-bit width are provided.

FIG. 4C shows an example of the register configuration of accumulators 143. The accumulators 143 are registers for arithmetic operation processes in the executing section 130. In this example, five registers (A0, ML0, MH0, ML1, and MH1) with a 32-bit width are provided. The accumulator A0 is a register used for addition and subtraction among the arithmetic operation processes. The four registers other than the accumulator A0 are registers used for multiplication among the arithmetic operation processes. The accumulators ML0 and MH0 are used as a 64-bit register M0 combining the lower 32 bits and the upper 32 bits. The accumulators ML1 and MH1 are used as a 64-bit register M1 combining the lower 32 bits and the upper 32 bits.

It should be noted that here, alphabets indicating each register are denoted by upper case letters, and are represented by lower case letters in the assembly notation described later, the both represent the same register.

[Image of Execution of VLIW Instruction]

FIG. 5 is a diagram showing an example of image of how a VLIW instruction is executed according to an embodiment of the present invention. Assuming that a single VLIW instruction includes four instructions, these four instructions can be executed simultaneously. It should be noted, however, that in actual programs, there are cases where data dependencies arise, such as when data generated by a given instruction is referenced by another instruction. In those cases, it is necessary to delay the execution of the succeeding instruction in order to wait for the data to become available.

In the case of this diagram, it is assumed that a VLIW instruction is repetitively executed 256 times, and the issuing of each instruction is delayed by two cycles due to data dependencies. That is, since the result of an instruction A issued in the 1st cycle can be used in the 3rd cycle, an instruction B is issued in the 3rd cycle. Since the result of the instruction B issued in the 3rd cycle can be used in the 5th cycle, an instruction C is issued in the 5th cycle. Since the result of the instruction C issued in the 5th cycle can be used in the 7th cycle, an instruction D is issued in the 7th cycle.

Accordingly, in this case, in an embodiment of the present invention, it is necessary to set "256" in the repeat count setting register 125, and set "2" in the latency setting register 126. At this time, while four instructions are simultaneously executed in the 7th cycle to the 256th cycle, in other cycles, at least one of those instructions is a NOP (No-OPeration) instruction. That is, the 1st to 6th cycles correspond to the transition period at the beginning, and the 257th to 262th cycles correspond to the transition period at the end. In techniques according to the related art, it is necessary for these transition periods to be explicitly coded.

FIGS. 6A and 6B are diagrams showing an example of coding by a VLIW instruction according to the related art. FIG. 6A shows a target algorithm written in C language. That is, while increasing a variable i from "0" to "255" by adding "1" to the variable i at a time, a multiplication (a[i]×b[i]) is executed, and the multiplication result is right-shifted by c bits (m[i]>>c).

In techniques according to the related art, as shown in FIG. 6B, it is necessary to explicitly code the transition period at the beginning (the 1st to 6th rows) while taking data dependencies into consideration, and then code the repetition part (the 7th to 9th rows). Then, it is further necessary to explicitly code the transition period (the 10th to 15th rows) at the end.

It should be noted that in this example, the id instruction is a load instruction, which loads each 32-bit portion of 64-bit data from an address indicated by $men( ) to each of two concatenated general purpose registers (R0 and R1 or R2 and R3). Here, "r0: r1" indicates concatenation of the general purpose registers R0 and R1. The mul instruction is a multiply instruction, which multiplies the values of two 32-bit wide general purpose registers together, and stores the result into a 64-bit wide accumulator (M0 or M1). The sra instruction is an arithmetic right shift instruction, which right-shifts the value of the 64-bit wide accumulator a number of times indicated by the general purpose register r23, and stores the result into a general purpose register (R16 or R17). The swa instruction is a store instruction, which stores the value of a general purpose register (R16 or R17) to an address indicated by $men( ). The nop instruction is a no-operation instruction, which performs no processing. The loop instruction is a branch instruction for forming a loop, which repeatedly executes a predetermined number of times between it and a labeled instruction.

FIGS. 7A to 7D are diagrams each showing an example of coding by a VLIW instruction according to an embodiment of the present invention. The target algorithm is the same as that in FIGS. 6A and 6B. FIGS. 7A and 7B show a first example, which is of a type that prefixes a repeat instruction that designates repetition. The rpt instruction is a repeat instruction that designates repetitive execution of a VLIW instruction, and executes the VLIW instruction (instructions A to D) in the next cycle a number of times set in the repeat count setting register 125 (rptr). That is, the id instruction, the mul instruction, the sra instruction, and the sw instruction included in the next VLIW instruction are repetitively executed.

At this time, by setting "256" in the repeat count setting register 125 and setting "2" in the latency setting register 126 in advance, execution of each instruction is performed at the same timing as that shown in FIG. 5.

Also, in this case, "0" is set as the initial value of the offset value register 410 of each source operand of the mul instruction, and "2" is set in the offset increment register 420. Thus, due to the register circulator 440, the value of the offset value register 410 of each source operand of the mul instruction repeatedly alternates between "0" and "2". Therefore, as the source operands of the mul instruction, R0 and R1, and R2 and R3 are generated in alteration. Also, "0" is set as the initial value of the offset value register 410 of the destination operand of the mul instruction, and "1" is set in the offset increment register 420. Thus, due to the register circulator 440, the value of the offset value register 410 of the destination operand of the mul instruction repeatedly alternates between "0" and "1". Therefore, as the destination operand of the mul instruction, M0 and M1 are generated in alteration. Updating of the offset value register 410 by the register circulator 440 will be described later.

In the first example described above, since the repeat instruction is implemented as a single independent instruction, three out of the four instruction fields are NOP instructions, which is wasteful. Accordingly, in a second example described below, a 1-bit repeat flag is provided within a VLIW instruction, and repetitive execution of the VLIW instruction is controlled in accordance with the status of this repeat flag.

FIGS. 7C and 7D show the second example, in which if the repeat flag within a VLIW instruction indicates ON, the VLIW instruction is repetitively executed. Conversely, if the repeat flag indicates OFF, the VLIW instruction is executed only once.

It should be noted that the repeat instruction and the repeat flag described here each represent an example of repeat information described in the claims.

FIGS. 8A and 8B are diagrams showing an example of circulation of a register offset value by the register circulator 440 according to an embodiment of the present invention. When repetitively executing a VLIW instruction, if different registers can be used for each of cycles corresponding to the latency, independent executions are possible. For example, in the case of FIG. 6B, by using the general purpose registers R0 and R1, and R2 and R3, it is possible to successively issue two load instructions with a latency "2". If only the general purpose registers R0 and R1 can be used, a load instruction can be issued only every two cycles, leading to a decrease in processing efficiency. Accordingly, in the register circulator 440, the value of the offset value register 410 is updated in a circulating fashion, thereby implementing register renaming.

FIG. 8A shows an example of circulation of the register address of a general purpose register, in the case when the value of the offset increment register 420 is "1" and the latency set in the latency setting register 126 ranges from "1" to "3". When the latency is "1", the register offset value remains "0". When the latency is "2", the register offset value repeatedly alternates between "0" and "1". When the latency is "3", the register offset value circulates between "0", "1", and "2". Therefore, the general purpose register R0 in the VLIW instruction changes in such a way as to remain R0 when the latency is "1", repeatedly alternate between R0 and R1 when the latency is "2", and circulate between R0, R1, and R2 when the latency is "3".

FIG. 8B shows an example of circulation of the register address of an accumulator, in the case when the value of the offset increment register 420 is "1" and the latency set in the latency setting register 126 ranges from "1" to "2". When the latency is "1", the register offset value remains "0". When the latency is "2", the register offset value repeatedly alternates between "0" and "1". Therefore, the accumulator M0 in the VLIW instruction remains M0 when the latency is "0", and repeatedly alternates between M0 and M1 when the latency is "2".

In this way, according to the first embodiment of the present invention, a VLIW instruction is dynamically repeated while shifting the timing in accordance with the latency set in the latency setting register 126, thereby making it possible to avoid explicitly coding transition periods. In addition, the register address is renamed by updating the value of the offset value register 410 so as to circulate in accordance with the latency set in the latency setting register 126, thereby enabling improved processing efficiency.

<2. Second Embodiment>
[Example of Configuration of Information Processing Apparatus]

Figure 9:
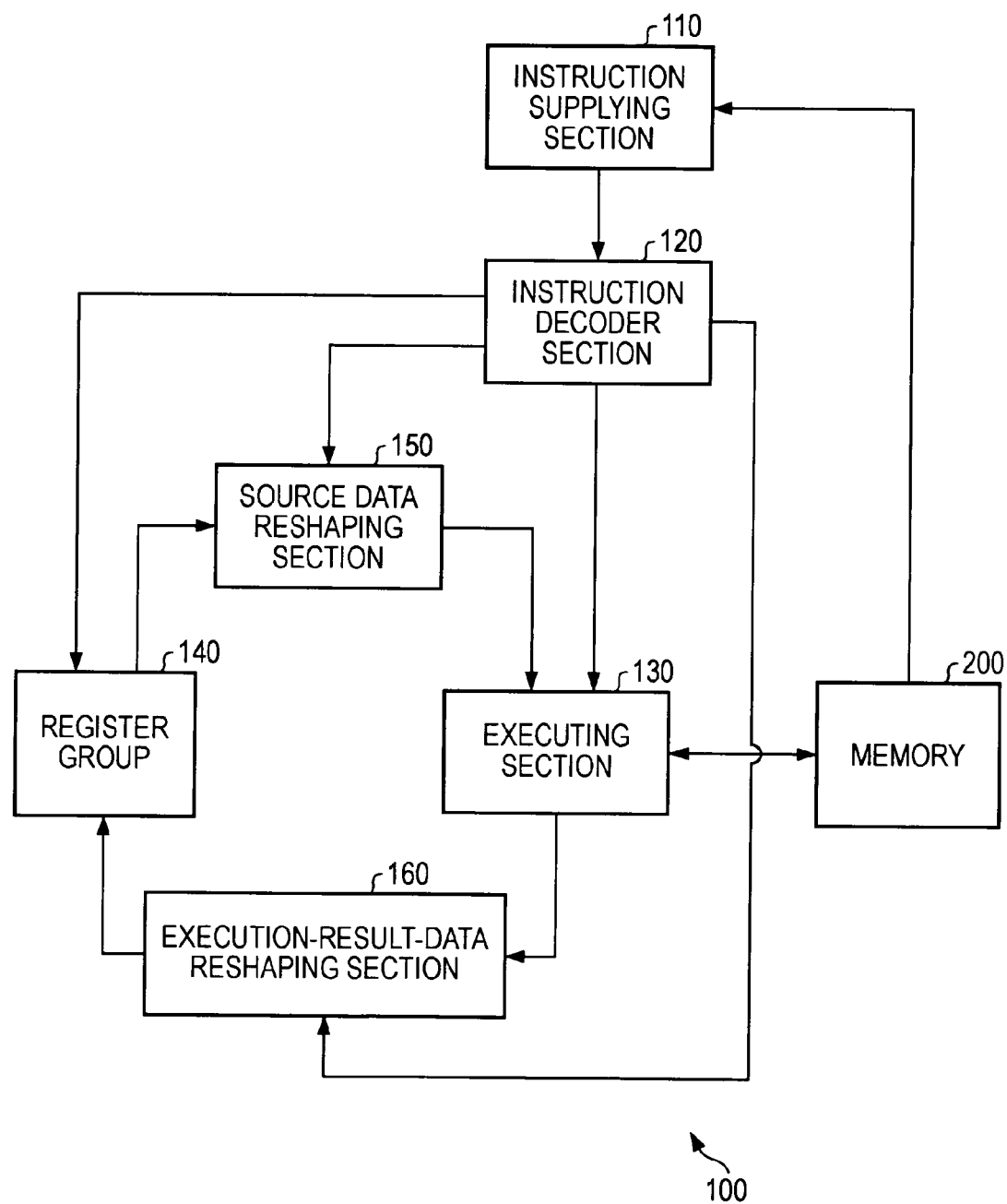
FIG. 9 is a diagram showing an example of the configuration of an information processing apparatus according to a second embodiment of the present invention.

FIG. 9 is a diagram showing an example of the configuration of the information processing apparatus 100 according to a second embodiment of the present invention. To handle halfwords, the information processing apparatus 100 according to the second embodiment includes a function of reshaping source data supplied to the executing section 130 and execution result data outputted from the executing section 130. Thus, the information processing apparatus 100 according to the second embodiment differs from that according to the first embodiment described above in that a source data shaping section 150 and an executing-result-data reshaping section 160 are further provided. The source data reshaping section 150 reshapes source data read from the register group 140, in accordance with the decode result. The executing-result-data reshaping section 160 reshapes execution result data outputted from the executing section 130, in accordance with the decode result.

Since the instruction supplying section 110 and the register group 140 are the same as those in the first embodiment, description thereof is omitted here. While the overall configuration of the instruction decoder section 120 is the same as that in the first embodiment, the internal configuration of the operand transforming section 124 is different, and a description in this regard will be given later. Since the executing section 130 is partially modified, a description in this regard will be also given later.

[Example of Configuration of Operand Transforming Section]

Figure 10:
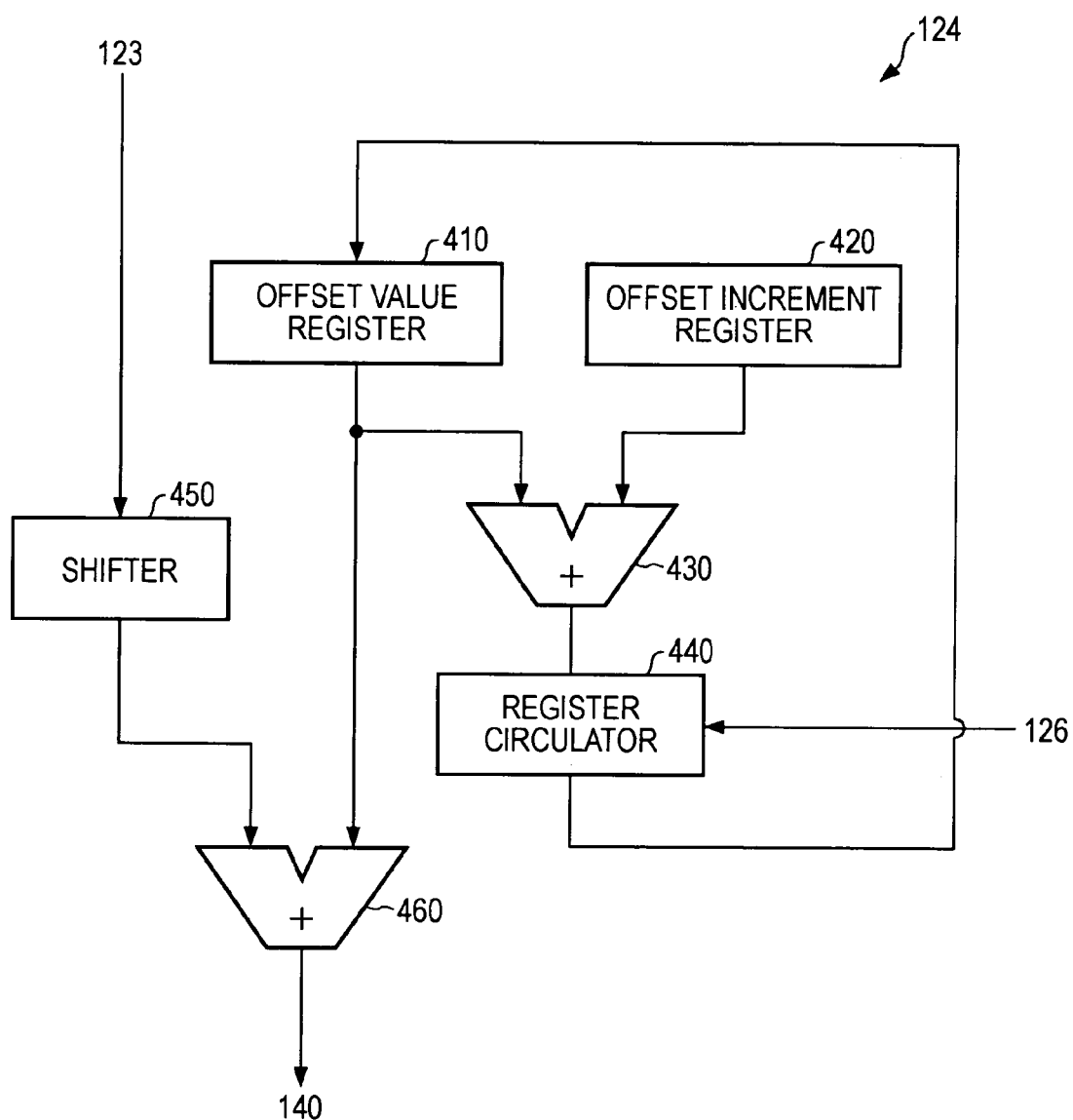
FIG. 10 is a diagram showing an example of the configuration of an operand transforming section according to the second embodiment of the present invention.

FIG. 10 is a diagram showing an example of the configuration of the operand transforming section 124 according to the second embodiment of the present invention. The operand transforming section 124 according to the second embodiment differs from that in the first embodiment described above with reference to FIG. 3 in that the operand transforming section 124 transforms operand register addresses in halfword units and includes a shifter 450, and otherwise its configuration is the same.

The shifter 450 left-shifts the register address of an operand supplied from the issue timing control section 123 by 1 bit. Thus, the register address outputted from the shifter 450 is one with the lower 1 bit removed, with a halfword taken as a unit. The lower 1 bit is supplied from the offset value register 410.

Figure 11:
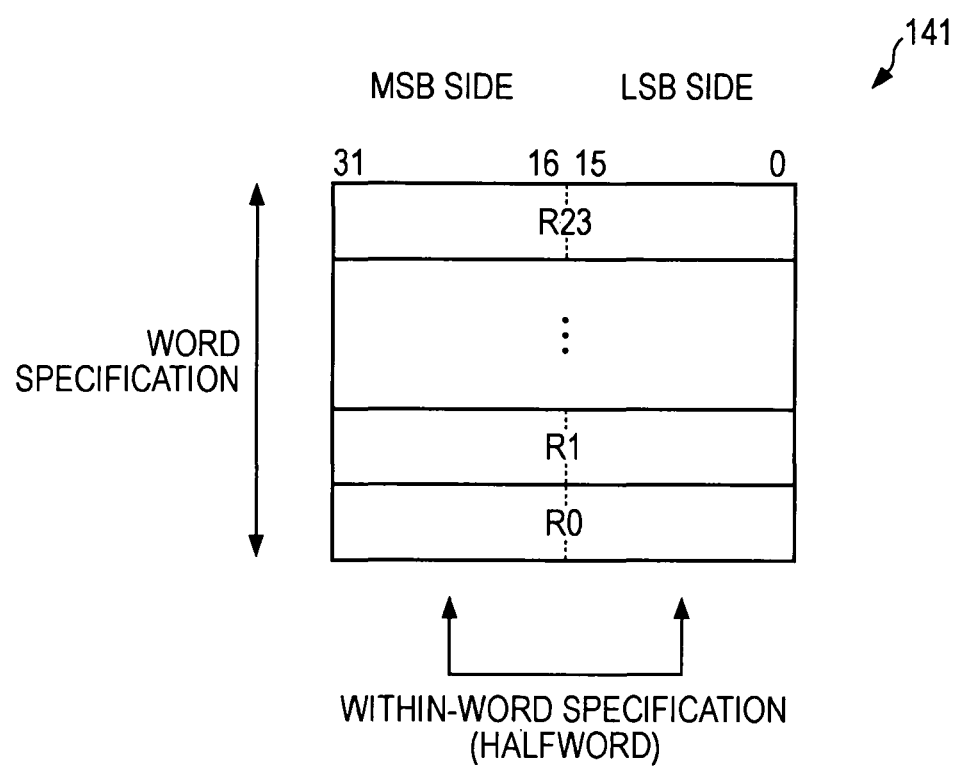
FIG. 11 is a diagram showing how to make a halfword access according to the second embodiment of the present invention.

FIG. 11 is a diagram showing how to make a halfword access according to the second embodiment of the present invention. Although this example illustrates an application to the general purpose registers 141, the same applies to the coefficient registers 142 and the accumulators 143.

In normal specification of a word, the specification is performed by the operand of an instruction, in 32-bit one word units. In contrast, to specify a 16-bit halfword, in addition to the word specification, it is necessary to specify either the MSB side or the LSB side as within-word specification. This within-word specification can be done by the least significant bit of the offset value register 410.

[Example of Configuration of Source Data Reshaping Section]

Figures 12, 13:
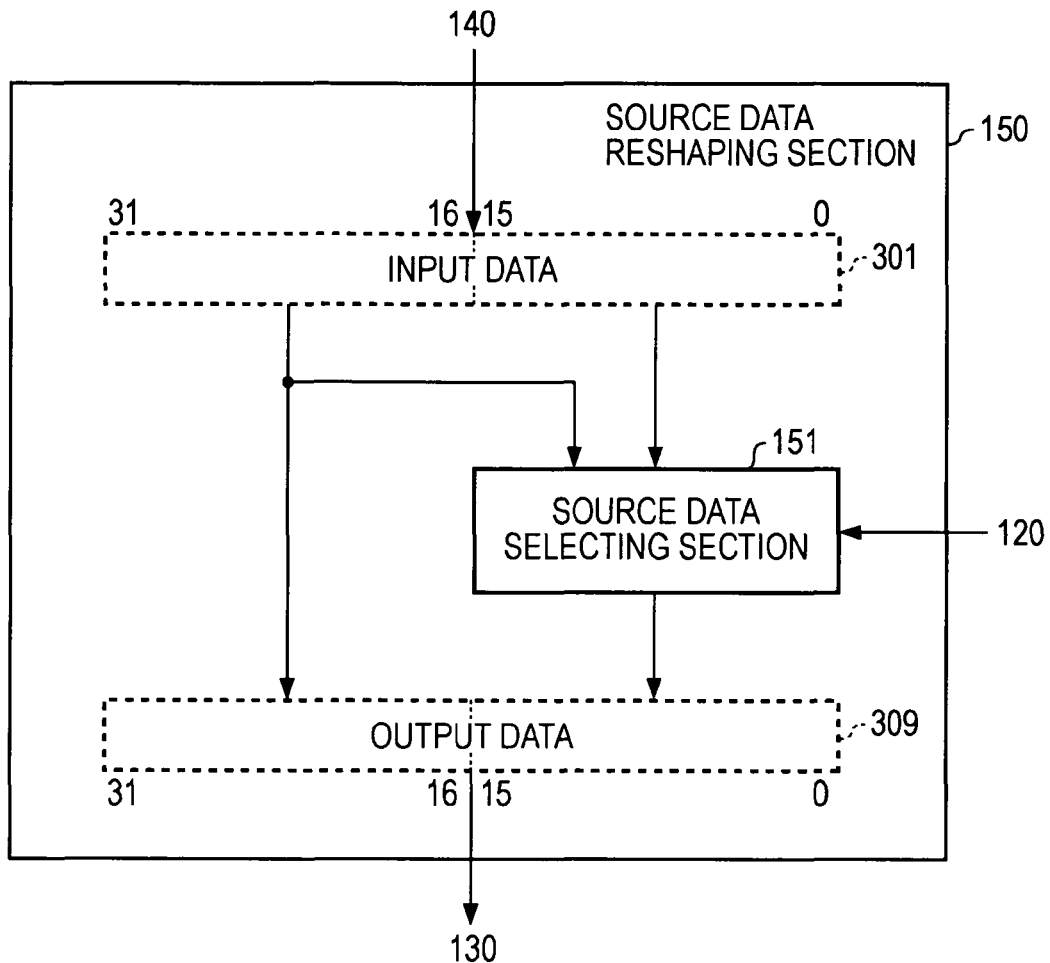
FIG. 12 is a diagram showing an example of the configuration of a source data reshaping section according to the second embodiment of the present invention.
FIG. 13 is a truth table of operation of a source data selecting section according to the second embodiment of the present invention.

FIG. 12 is a diagram showing an example of the configuration of the source data reshaping section 150 according to the second embodiment of the present invention. The source data reshaping section 150 includes a source data selecting section 151.

Input data 301 of 32 bits supplied from one of the registers of the register group 140 is inputted to the source data selecting section 151, as 16-bit halfword data on each of the LSB side and the MSB side. The source data selecting section 151 selects the 16-bit data on either the LSB side or the MSB side in accordance with the decode result in the instruction decoder section 120. The output of the source data selecting section 151 becomes the 16-bit data on the LSB side of output data 309. The 16-bit data on the MSB side of the output data 309 is the same as the 16-bit data on the MSB side of the input data 301. That is, two cases are conceivable for the output data 309, one being the case where the output data 309 completely matches the input data 301, and the other being the case where the 16-bit data on the MSB side of the input data 301 is also outputted on the LSB side of the output data 309.

While an illustration is given with respect to a single piece of data in FIG. 12, a plurality of (two for the purpose of the executing section 130 described below) the same circuits are prepared in accordance with the number of operands.

FIG. 13 is a truth table of operation of the source data selecting section 151 according to the second embodiment of the present invention. If, as a result of decoding in the instruction decoder section 120, it is determined that it is unnecessary to swap data for halfword access, the source data selecting section 151 selects the 16-bit data on the LSB side of the input data 301. On the other hand, if it is determined that it is necessary to swap data for halfword access, the source data selecting section 151 selects the 16-bit data on the MSB side of the input data 301. Thus, on the LSB side of the output data 309, the 16-bit data on either the LSB side or the MSB side of the input data 301 is outputted depending on the decode result.

[Example of Configuration of Executing Section]

Figure 14:
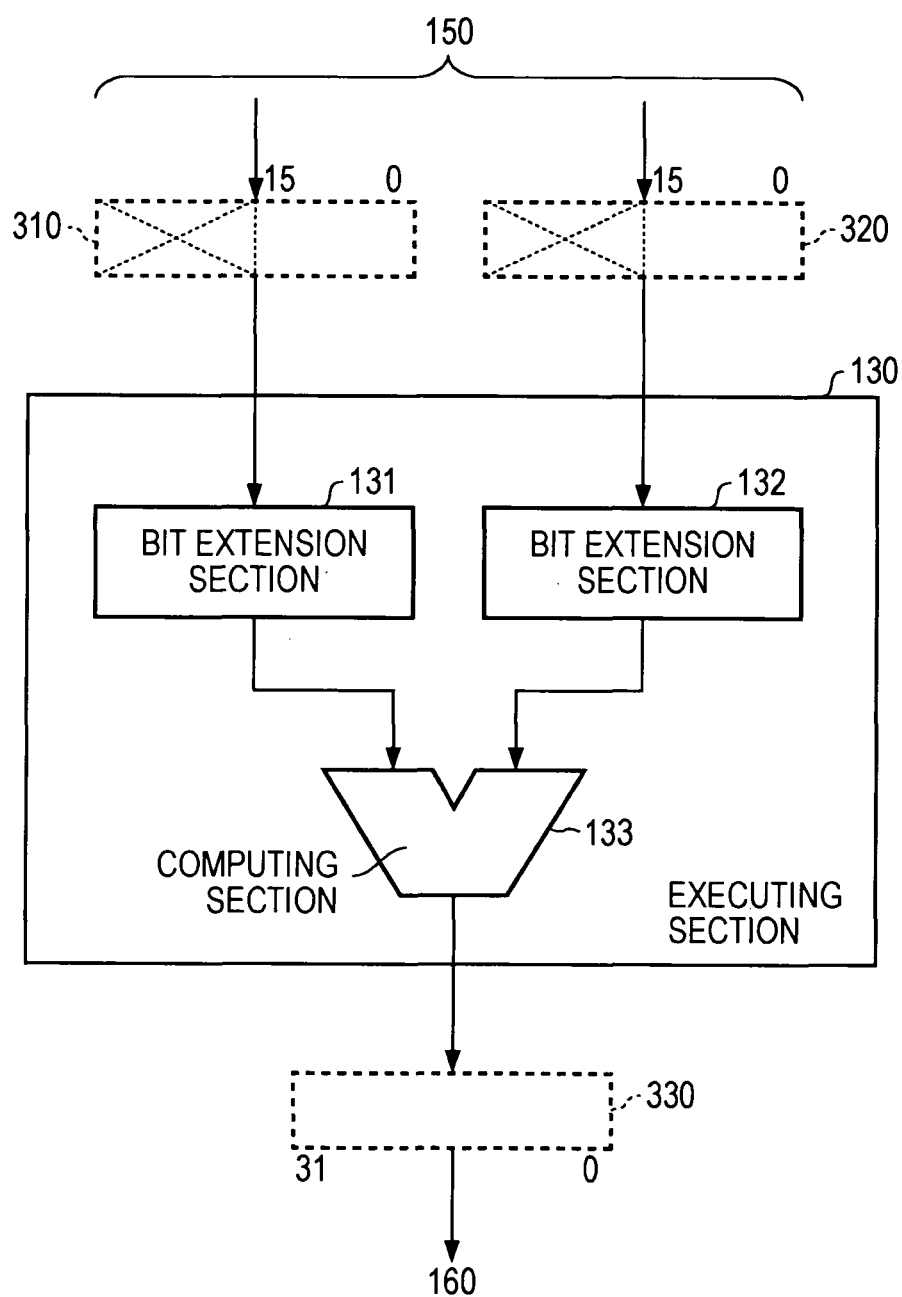
FIG. 14 is a diagram showing an example of the configuration of an executing section according to the second embodiment of the present invention.

FIG. 14 is a diagram showing an example of the configuration of the executing section 130 according to the second embodiment of the present invention. The executing section 130 performs computations on two pieces of input data 310 and 320 supplied from the source data reshaping section 150 after applying bit extension, and outputs output data 330. The executing section 130 includes bit extension sections 131 and 132 for the two pieces of input data, and a computing section 133.

The bit extension section 131 sign-extends or zero-extends the 16-bit data on the LSB side of the input data 310 to 32-bit precision in accordance with the decode result. The bit extension section 132 sign-extends or zero-extends the 16-bit data on the LSB side of the input data 320 to 32-bit precision in accordance with the decode result. The outputs of the bit extension sections 131 and 132 are each supplied to the computing section 133 as 32-bit data.

The computing section 133 performs computations on the 32-bit data supplied from each of the bit extension sections 131 and 132, in accordance with the decode result in the instruction decoder section 120. The computation result of the computing section 133 is supplied to the execution-result-data reshaping section 160 as the output data 330 with 32-bit precision.

[Example of Configuration of Execution-result-data Reshaping Section]

Figures 15, 16:
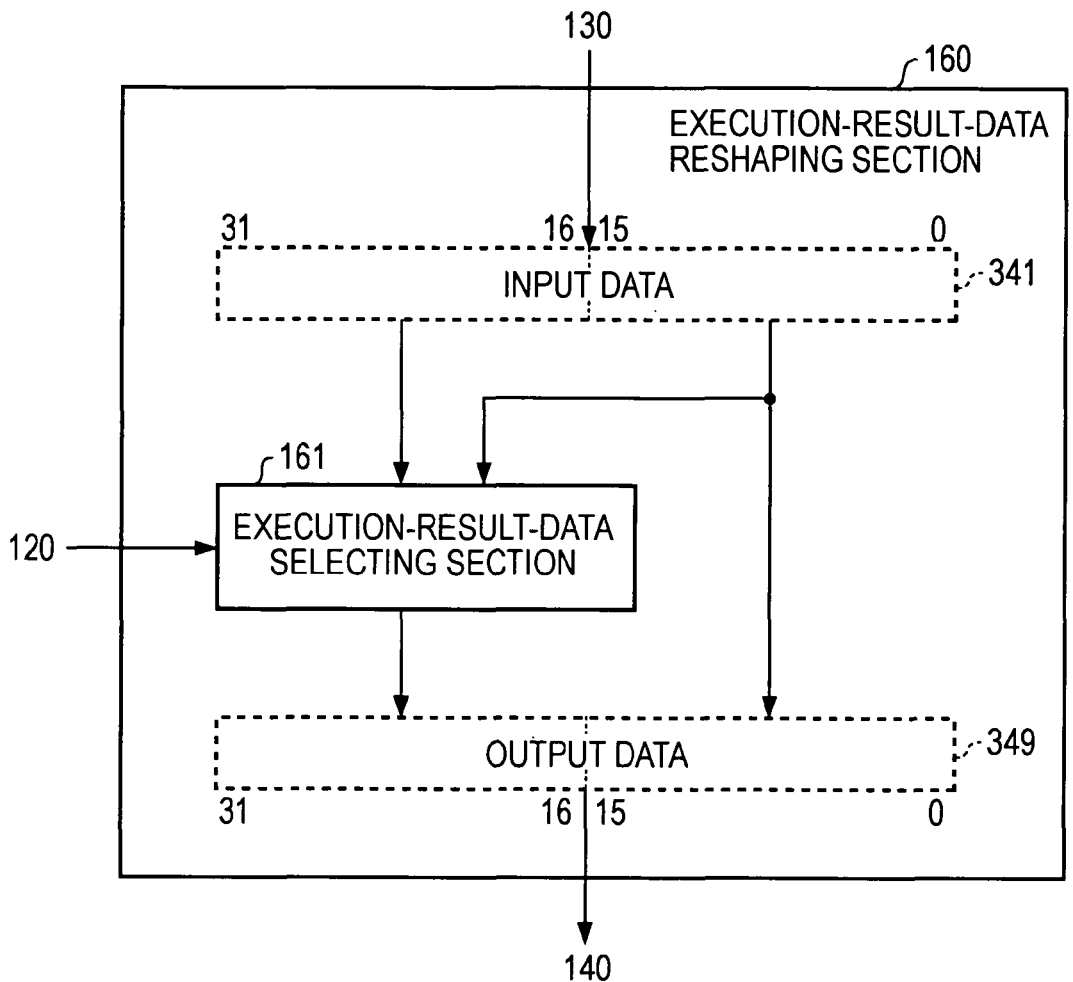
FIG. 15 is a diagram showing an example of the configuration of an execution-result-data reshaping section according to the second embodiment of the present invention.
FIG. 16 is a truth table of operation of an execution-result-data selecting section according to the second embodiment of the present invention.

FIG. 15 is a diagram showing an example of the configuration of the execution-result-data reshaping section 160 according to the second embodiment of the present invention. The execution-result-data reshaping section 160 includes an execution-result-data selecting section 161.

Input data 341 of 32 bits supplied from the executing section 130 is inputted to the execution-result-data selecting section 161 as halfword data of 16 bits on each of the LSB side and on the MSB side. The execution-result-data selecting section 161 selects the 16-bit data on either the LSB side or the MSB side in accordance with the decode result in the instruction decoder section 120. The output of the execution-result-data selecting section 161 becomes the 16-bit data on the MSB side of output data 349. The 16-bit data on the LSB side of the output data 349 is the same as the 16-bit data on the LSB side of the input data 341. That is, two cases are conceivable for the output data 349, one being the case where the output data 349 completely matches the input data 341, and the other being the case where the 16-bit data on the LSB side of the input data 341 is also outputted on the MSB side of the output data 349.

FIG. 16 is a truth table of operation of the execution-result-data selecting section 161 according to the second embodiment of the present invention. If, as a result of decoding in the instruction decoder section 120, it is determined that it is unnecessary to swap data for halfword access, the execution-result-data selecting section 161 selects the 16-bit data on the MSB side of the input data 341. On the other hand, if it is determined that it is necessary to swap data for halfword access, the execution-result-data selecting section 161 selects the 16-bit data on the LSB side of the input data 341. Thus, on the MSB side of the output data 349, the 16-bit data on either the LSB side or the MSB side of the input data 341 is outputted depending on the decode result.

In this way, in the second embodiment of the present invention, 16-bit halfword data can be sign-extended or zero-extended and computed as 32-bit data, and then restored to a halfword before being stored into a register.

[Example of Application to Symmetric Filtering Operation]

FIGS. 17A to 17C are diagrams showing an example of the relationship between registers and arrays in a symmetric filtering operation as an example of application of the second embodiment of the present invention. FIG. 17A shows an equation of a target symmetric filtering operation. Array L represents sampling data, and array Coef represents filter coefficients. Since the variable n of summation takes a value from 0 to 8, the array L and the array Coef have 17 elements from L[0] to L[16] and 9 elements from Coef[0] to Coef[8], respectively. After summation, a right-shift is performed a number of times indicated by the immediate NORM, and the result is substituted into the filtering result Result with 32-bit precision. The immediate NORM is a normalized value, and "5" or "6" is used in actuality.

As shown in FIGS. 17B and 17C, the array L is assigned to the general purpose registers 141, and the array Coef is assigned to the coefficient registers 142. Each data is assigned as a halfword with 16-bit precision. Thus, all of the arrays necessary for the equation in FIG. 17A can be assigned to the general purpose registers 141 and the coefficient registers 142, thereby improving the efficiency of program code.

FIGS. 18A and 18B are diagrams each showing an example of program code of a filterihg operation as an example of application of the second embodiment of the present invention. FIG. 18A shows an example of program code executed by a VLIW processor that is assumed to execute two instructions.

An rpt instruction and a nop instruction are written in the first step. The rpt instruction is a repeat instruction designating the number of times the next step is to be repeated. Due to the rpt instruction, two instructions in the second step are repeated nine times. At this time, by setting "1" in the latency setting register 126 in advance, the instruction on the right side of the second step is started with a delay of 1 cycle. It should be noted that the nop operation is a no-operation instruction, and no operation is performed.

In the second step, an addh instruction and a madd instruction are written. The addh instruction is an halfword add instruction that sign-extends the halfwords of two general purpose registers to 32 bits and adds the sign-extended halfwords as input operands, and stores the result into the accumulator A0 with 32-bit precision. The madd instruction is a product-sum instruction that multiplies the value of the accumulator A0 with 32-bit precision by the value of a coefficient register with 16-bit precision, and adds the multiplication result to the accumulator M0 with 64-bit precision.

In the third step, a sra instruction and a nop instruction are written. The sra instruction is a right shift instruction that right-shifts the value of the accumulator M0 with 64-bit precision a number of times indicated by the immediate NORM, and stores the result into the general purpose register R9 with 32-bit precision.

The respective addresses of a general purpose register and a coefficient register are determined by designation of an operand in an instruction code, and the offset value register 410. The offset value register 410 is provided for each operand, and is updated in accordance with its corresponding offset increment register 420. In this example, the value of the offset increment register 420 is set to "+1" (halfword increase) for one of the two input operands of the addh instruction, and to "−1" (halfword decrease) for the other. The value set with respect to the coefficient register as the input operand of the madd instruction is "1" (halfword increase). It should be noted that here, an increase in 32-bit units is "+2", and a decrease in 32-bit units is "−2". As the initial value of the offset value register 410, "8" is set for both of the two input operands of the addh instruction and "0" is set for its output operand, and "0" is set for the coefficient register that is the input operand of the madd instruction.

FIG. 18B is a diagram showing the timing with which the program code shown in FIG. 18A is executed. First, in the 1st cycle, addition of L[8](R4(LSB)) and L[8](R4(LSB)) is performed. In the 2nd cycle, addition of L[9](R4(MSB)) and L[7](R3(LSB)) is performed, and also the addition result of the 1st cycle is multiplied by Coef[0](KR0(LSB)). Processing is subsequently performed in the same manner so that in the 9th cycle, addition of L[16](R8(LSB)) and L[0](R0 (LSB)) is performed, and also the addition result of the 8th cycle is multiplied by Coef[7](KR3(MSB)). Then, in the 10th cycle, the addition result of the 9th cycle is multiplied by Coef[8](KR4(LSB)). Lastly, in the 11th cycle, the product-sum result of the 10th cycle is right-shifted a number of times indicated by the immediate NORM, and the result is stored into the general purpose register R9.

In this way, according to the second embodiment of the present invention, a VLIW instruction can be dynamically repeated while renaming register addresses in halfword units, thereby enabling effective use of registers and reduced program code.

<3. Modifications>

While the above-described embodiments are directed to the case in which the register addresses of operands are transformed in word or halfword units, the position at which necessary data is cut out may be an arbitrary bit position in a register as described below.

[First Modification]

FIG. 19 is a diagram showing a first modification of the source data reshaping section 150 according to an embodiment of the present invention. In the first modification of the source data reshaping section 150, the n-bit portion from the x-th bit of the 32-bit input data 301 read from the register group 140 is extracted as extraction data 302 by a data extracting section 152. The n-bit extraction data 302 is sign-extended or zero-extended by the bit extension section 153 and becomes the output data 309 of 32 bits. The output data 309 is supplied to the executing section 130.

According to the first modification of an embodiment of the present invention, since extraction and extension of data are executed in an instruction that references input data, it is not necessary to separately execute independent data extraction and data extension instructions, thereby enabling a reduction in program code size.

[Second Modification]

Figure 20:
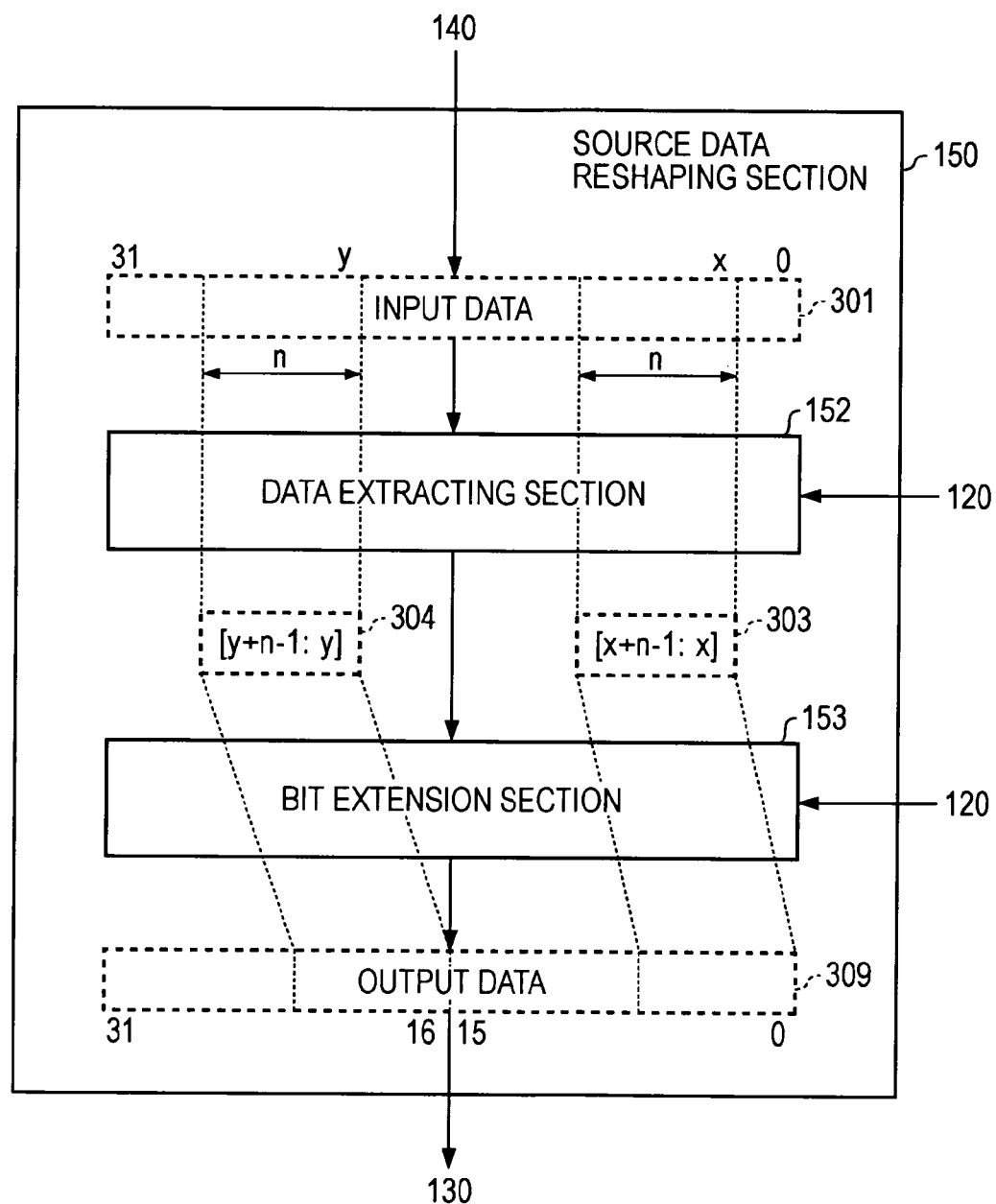
FIG. 20 is a diagram showing a second modification of a source data reshaping section according to an embodiment of the present invention.

FIG. 20 is a diagram showing a second modification of the source data reshaping section 150 according to an embodiment of the present invention. In the second modification of the source data reshaping section 150, two pieces of extraction data are extracted by the data extracting section 152 from the 32-bit input data 301 read from the register group 140. That is, the n-bit portion from the x-th bit of the input data 301 is extracted as extraction data 303, and the n-bit portion from the y-th bit of the input data 301 is extracted as extraction data 304.

Then, the n-bit extraction data 303 is sign-extended or zero-extended to 16 bits by the bit extension section 153, and is set on the LSB side of the output data 309. Also, the n-bit extraction data 304 is sign-extended or zero-extended to 16 bits by the bit extension section 153, and is set on the MSB side of the output data 309. That is, the 32-bit output data 309 includes two pieces of 16-bit data. In this case, the output data 309 is supplied to the executing section 130 as two input operands.

According to the second modification of an embodiment of the present invention, two pieces of 16-bit data are extracted from a single piece of input data and sign-extended. Thus, twice as many operators can be run in parallel without separately executing independent data extraction and data extension instructions.

[Other Modifications]

It should be noted that in an embodiment of the present invention, by extending the bit widths of the offset value register 410 and offset increment register 420, it is possible to extend the number of words of the coefficient registers 142 without causing an increase in the operand bit width of the program code. Thus, in the case of algorithms of filtering operations or the like in which a large number of coefficients (filter taps) are necessary, operands written in the program code can be handled without being renamed. It is thus easy to configure extended coefficient registers as ROMs.

In the offset value register 410 and the offset increment register 420, by providing not only 16-bit granularity but also decimal point bits, the frequency of updating of operand designation can be reduced to a frequency of less than once every time. This also makes it possible to, for example, reference the same coefficient value consecutively.

It should be noted that the embodiments of the present invention are illustrative of an example for implementing the present invention, and as explicitly stated in the embodiments of the present invention, there is a mutual correspondence between matters in the embodiments of the present invention, and invention-defining matters in the claims. Likewise, there is a mutual correspondence between invention-defining matters in the claims, and matters in the embodiments of the present invention which are denoted by the same names as those of the invention-defining matters. It should be noted, however, that the present invention is not limited to the embodiments, and the present invention can be implemented by making various modifications to the embodiments without departing from the scope of the present invention.

The processing steps described with reference to the embodiments of the present invention may be grasped as a method having a series of these steps, or may be grasped as a program for causing a computer to execute a series of these steps or a recording medium that stores the program. As this recording medium, for example, a CD (Compact Disc), an MD (MiniDisc), a DVD (Digital Versatile Disk), a memory card, a Blur-ray Disc (registered trademark), or the like can be used.

The present application contains subject matter related to that disclosed in Japanese Priority Patent Application JP 2009-245013 filed in the Japan Patent Office on Oct. 26, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
one or more processors operable to:
repetitively execute a plurality of execution processes corresponding to a plurality of instructions in parallel;
control an issue timing of each of the plurality of instructions so that each of the plurality of execution processes are executed with a timing delayed in accordance with a predetermined latency; and
transform an operand register address of each of the plurality of instructions in accordance with a predetermined increment value upon each repetition of the execution, wherein the operand register address is renamed when a value of an offset value register associated with an operand register is updated in accordance with the predetermined latency, and wherein the predetermined increment value is stored in an offset increment register to be added to the value of the offset value register upon each repetition of the execution.

2. The information processing apparatus according to claim 1, wherein when transforming the operand register address, the one or more processors are operable to cause the operand register address to perform a circulation in accordance with the predetermined latency.

3. The information processing apparatus according to claim 2, wherein when transforming the operand register address, the one or more processors are operable to perform the circulation by performing an addition or subtraction on the operand register address in accordance with the predetermined increment value and calculating a remainder due to the predetermined latency.

4. The information processing apparatus according to claim 1, wherein the one or more processors are operable to attach information identifying a half-word to the operand register address assigned in word units to transform the operand register address in half-word units.

5. The information processing apparatus according to claim 1, wherein
an instruction group corresponding to the plurality of instructions comprises repeat information to designate whether or not the repetitive execution is necessary; and
the one or more processors are operable to repetitively execute the plurality of execution processes corresponding to the plurality of instructions included in the instruction group if the repeat information designates the repetitive execution.

6. The information processing apparatus according to claim 1, further comprising:
registers each accessed by the operand register address being transformed,
wherein the one or more processors are operable to reshape source data read from each of the registers, wherein each of the registers is accessed by the operand register address; and
reshape execution result data, and supply the reshaped execution result data to each of the registers as write data.

7. The information processing apparatus according to claim 6, wherein the one or more processors are operable to:
supply one of upper 16 bits and lower 16 bits of 32-bit data for execution;
perform each of the plurality of execution processes after applying bit extension to the one of upper 16 bits and lower 16 bits, and output the execution result data of 32 bits; and
supply lower 16 bits of the execution result data as one of upper 16 bits and lower 16 bits of the write data.

8. The information processing apparatus according to claim 1, wherein the plurality of instructions are dynamically repeated while renaming the operand register address of each of the plurality of instructions in half-word units.

9. The information processing apparatus according to claim 1, wherein the predetermined increment value is a negative value.

10. An instruction decoder comprising:
one or more processors operable to:
control an issue timing of each of a plurality of instructions supplied as a single instruction group so that a plurality of execution processes corresponding to the plurality of instructions are each executed with a timing delayed in accordance with a predetermined latency; and
transform an operand register address of each of the plurality of instructions in accordance with a predetermined increment value upon every repetition of each of the plurality of execution processes, wherein the operand register address is renamed when a value of an offset value register associated with an operand register is updated in accordance with the predetermined latency, and wherein the predetermined increment value is stored in an offset increment register to be added to the value of the offset value register upon each repetition of the execution.

11. The instruction decoder according to claim 10, further comprising registers each accessed by the operand register address being transformed, wherein the one or more processors are operable to reshape source data read from each of the registers and execution result data, and supply the reshaped execution result data to each of the registers.

* * * * *